United States Patent Office  3,277,180
Patented Oct. 4, 1966

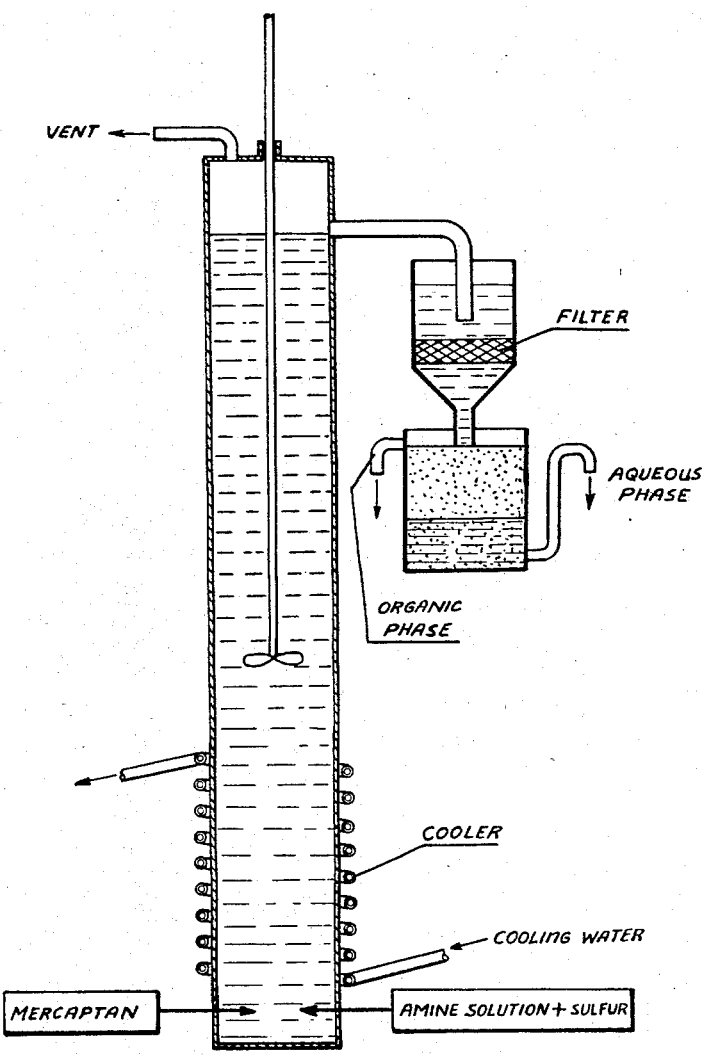

3,277,180
PROCESS FOR THE MANUFACTURE OF
ORGANIC DISULPHIDES
Pierre Bapseres and Michel Biensan, Pau, France, assignors to Societe Nationale des Petroles d'Aquitaine, Paris, France
Filed Jan. 15, 1964, Ser. No. 337,841
12 Claims. (Cl. 260—608)

The invention has for its object a new process for the manufacture of different organic disulphides and in particular dialkyl and diaryl disulphides.

Although the new process can serve for the preparation of very different disulphides of aliphatic radicals with linear or branched chains, aryl radicals, cycloaliphatic radicals, etc., it is especially suitable and has outstanding advantages for the production of dialkyl disulphides the alkyl of which contains 1 to 12 carbon atoms and diaryl disulphides the aryl of which has 6 to 12 carbon atoms.

There are thus easily obtained by means of the process according to the invention, for example, the disulphides of: dimethyl, diethyl, dipropyl, diisopropyl, n-dibutyl, diisobutyl, dihexyl, dioctyl, dinonyl, didecyl, didodecyl, diphenyl, ditolyl, diethylphenyl, dixylyl (ditolylbenzyl), diethylbenzyl, dinaphthyl, etc. When alkylbenzene derivatives are concerned the invention particularly aims at the disulphides in which the total number of carbon atoms in the alkyl radicals is 1 to 6.

It is known to prepare organic disulphides by treatment of corresponding mercaptans with sulphur; a direct sulphidation thus takes place, with elimination of hydrogen sulphide according to the reaction:

$$2\ RSH + S \rightleftharpoons R\text{—}S\text{—}S\text{—}R + H_2S \qquad (1)$$

In this known preparation, it is customary to use organic or inorganic basic agents, particularly alkali bases or amines, as catalysts. These agents lead to the formation of by-products which cannot be recovered and the manufacture results in a considerable sulphur consumption.

The new process according to the invention obviates these disadvantages; it enables organic disulphides to be produced with excellent yields, practically without irrecoverable by-products and with a minimum consumption of sulfur. The invention does in fact permit practically all the sulphur of the $H_2S$ which is liberated by the reaction (1) to be used again; the same sulphur thus serves cyclically for the sulphidation of the mercaptan after having been freed by oxidation from the formed $H_2S$. Another advantage of the new process is that of being able to operate conveniently with even fairly impure mercaptan, containing for example $CO_2$, air, nitrogen, etc.; in particular, it is possible to use the mixtures with a low mercaptan content, originating for example directly from units for the manufacture of methyl mercaptan before any distillation. The invention makes it possible to obtain disulphides with a purity higher than about 98% without subsequent distillation or purification.

The new process according to the invention consists in causing the sulphur to react with one or more mercaptans in the presence of an aqueous solution of an amine in a quantity sufficient to absorb the hydrogen sulphide in proportion as this latter is formed. That means the amounts of amine used according to the invention are incomparably larger than the only catalytical proportions of the order of 1% or less, which were used in known methods.

Thus, according to the invention, the equilibrium of the reaction (1) is constantly displaced towards the right by the elimination of the $H_2S$ by means of the amine with which it is combined.

Preferably, the reaction mixture according to the invention contains about 2 mols of mercaptan with at least one atom of sulphur, while the preferred quantity of amine is at least of the order of one equivalent. It is highly advantageous to use an amine excess.

According to another feature of the invention, the solution of amine hydrosulphide formed during the reaction is subsequently dissociated in order to regenerate on the one hand the hydrogen sulphide and on the other hand the amine, the latter being used again in the sulphidation of the mercaptan according to the reaction (1). In a cycle of economic operations, the regenerated $H_2S$ is subjected to oxidation in the known manner in order to liberate the sulphur which is employed in the reaction (1).

It is apparent from the foregoing that the invention is carried out under the best conditions when the amine used is sufficiently heavy, that is to say, is not very volatile and is soluble in water.

In order that the aqueous solution of amine hydrosulphide loses the least possible amount of amine during its heating for the purpose of separating the $H_2S$, it is preferable to use amines the boiling point of which is higher than 100° C. Such amines are found in the different classes: aliphatic, aromatic or cycloaliphatic classes.

By way of non-limitative examples, certain of the amines which are suitable for the new process are set out below, with their boiling points in ° C.:

| | |
|---|---|
| n-Hexylamine | 129–130° |
| 2-ethyl butylamine | 125° |
| n-Octylamine | 175° |
| n-Octylamine (secondary) | 164° |
| 2-ethyl-1-aminohexane | 167° |
| Ethylene diamine | 117° |
| Diethylene diamine (hydrate) | 125–130° |
| Diethylene triamine | 208° |
| Triethylene tetramine | 266° |
| Tetramethylene diamine | 158–160° |
| Cyclohexylamine | 134° |
| Pyridine | 204–250° |
| Monoethanolamine | 171° |
| Diethanolamine | 270° |
| Triethanolamine ____(under 150 mm. Hg)__ | 277° |
| Isopropanolamine _____(under 1 mm. Hg)__ | 160° |

One particularly interesting class is formed by the alkanolamines and especially the ethanolamines; although the primary, secondary or tertiary ethanolamines, or their mixtures, may be suitable, very advantageous results have been particularly obtained with the monoethanolamine.

The use of the amines, particularly the alkanolamines, has the supplementary advantage of avoiding all loss of mercaptans in the form of mercaptides; it is in fact known that in the presence of strong bases, such as for example NaOH, there is formed the mercaptide RSNa, which reduces the yield. This type of compound is not produced with the amine, and this permits the use of a considerable excess of this latter, thus facilitating the quantitative displacement of the equilibrium (1).

The treatment of the mercaptan with sulphur in accordance with the invention is preferably carried out at a temperature which is between 0° and 50° C.; at these temperatures, there is avoided the possible crystallisation in the reaction medium while maintaining a suitable reaction velocity. On the other hand, if a temperature of about 50° C. is not exceeded, parasitic reactions which particularly lead to the formation of thiosulphates are avoided. Working at a moderate temperature provides the advantage of profiting from a fairly high solubility coefficient of the $H_2S$ in the amine aqueous solution.

According to another possible feature of the invention, the treatment of the mercaptan with the sulphur can be carried out under a pressure higher than atmospheric pressure, for example at 1 to 15 atm., this making it

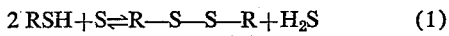

possible to increase the solubility of the hydrogen sulphide in the amine solution.

The invention is preferably carried out with the use of about 0.75 atom of sulphur to 2 mols of mercaptan; the proportion of sulphur with respect to the mercaptan can however vary within certain limits, for example between 0.5 and 3 gram-atoms of sulphur to 2 gram-molecules of mercaptan. Furthermore, as regards the proportion of amine, it can vary to a fairly large extent, especially above the proportion corresponding to one gram-equivalent of amine to 2 mols of mercaptan; however, the proportions which are preferred in practice are those which represent 1 to 2 equivalents of amine for 2 mols of mercaptan, that is to say, for 1 mol of $H_2S$, it being understood that 2RSH are capable of giving $1H_2S$.

The amine used is in aqueous solution, the concentration of which can be variable according to the nature of the amine, the temperature of the reaction, the nature of the mercaptan or mercaptans and possibly as a function of other practical considerations. These aqueous solutions most frequently titrate 10 to 80% by weight. In the case of monoethanolamine, particularly favourable results are obtained with a concentration equal or close to 50%.

The treatment of the mercaptan with the sulphur can be carried out continuously or intermittently, and one of the advantages of the present invention is just that it renders easily possible the first of these operational procedures.

Depending upon the nature of reagents used and temperature, the time of contact between sulphur and the mercaptan, within the aqueous solution of amine, can vary between about 10 and 120 minutes. When fairly light mercaptans are concerned, particularly methyl mercaptan, the duration of the treatment, i.e. of the reaction (1), is generally of the order of 20 minutes.

In carrying the invention into effect, one highly advantageous practical detail consists in introducing the sulphur into the reaction medium, in the form of a suspension in the amine solution which is used.

The reaction yields a medium composed of two phases, an aqueous phase and organic phase, this latter comprising the disulphide which is produced. The liquid phase, formed by the amine solution containing the combined $H_2S$ as well as a small quantity of dissolved mercaptan, is distilled with a view to its dissociation into $H_2S$ and amine intended for recycling. When the aqueous phase is heated, there is firstly obtained the mercaptan, in the case of light mercaptans such as $CH_3SH$; the recovery of this mercaptan does not present any problem; thus, 95% of dissolved $CH_3SH$ can be recovered by heating to 75° C.

After separating the aqueous solution from the monoethanolamine, it is found that the loss of this latter is very small, for example of the order of 0.25% per operational cycle, allowing for losses due to handling operations.

As regards the disulphide which is obtained, it can have a purity of 97% after a simple topping of the dissolved mercaptan, without distillation generally being necessary.

In order to illustrate the invention, a number of non-limitative examples are given below. The examples show each the use of one mercaptan, but it may be useful to start from a mixture of mercaptans, more especially of one or more of the methyl-, ethyl-, propyl-, isopropyl-, butyl- and phenyl- mercaptans.

*Example 1*

After having suspended 1 gram atom of sulphur (32 g.) in 1.5 mols of monoethanolamine (MEA), in 50% aqueous solution, this suspension is introduced into a reactor which is vigorously stirred, at the same time as injecting thereinto 2.2 mols of methyl mercaptan. This introduction lasts 10 minutes, after which the mixture is kept in the reactor, cooled with ice for about 10 more minutes. The reaction mixture is then decanted. The balance of the operation is set out as follows.

| Products used: | Grams |
|---|---|
| 1 atom of sulphur | 32 |
| 50% aqueous solution of MEA: | |
| 1.5 mol of MEA | 91.5 |
| H₂O | 91.5 |
| 2.21 mols of CH₃SH | 106 |
| | 321 |

| Products Obtained | Grams | Grams |
|---|---|---|
| Organic phase | 103 | |
| Dimethyldisulphide (DMDS) | | 90 |
| Dimethyltrisulphide | | 2.8 |
| Methyl mercaptan | | 10 |
| Hydrogen sulphide | | 0.2 |
| | | 103.0 |
| Aqueous phase | 218 | |
| H₂O | | 91.5 |
| MEA | | 91.5 |
| H₂S | | 33 |
| CH₃SH | | 2 |
| | 321 | 218.0 |

The rate of molar transformation of $CH_3SH$ into DMDS is 86.5%.

The excess methyl mercaptan is recycled in a fresh operation; the yield, taking into account this recycling, is 97.7%.

*Example 2*

The same operation as in Example 1 with diethanolamine (DEA) was applied with:

S _____ 1 gram-atom.
DEA _____ 1.2 mols in 50% aqueous solution.
CH₃SH _____ 2.3 mols.

Under these conditions, a yield of 87% is obtained.

*Example 3*

An operation is carried out continuously in a glass column with a diameter of 3.4 cm., and a height of 110 cm. The upper part of the column is agitated in order to assure an efficient contact between the two reaction phases, as shown in the drawing.

Working conditions:
    Contact time—45 minutes.
    Proportions of MEA—1.73 mol per 1 S.
    Proportions of S—0.846 gram-atom for 1 mol of $CH_3SH$.
    Ambient temperature.

The reagents: gaseous $CH_3SH$ and sulphur suspension in aqueous MEA solution are introduced into the bottom of the column. The liquid obtained at the head of the column is filtered and then decanted. In the lower part of the column, a coil maintains the temperature at 20° C. by water circulation.

The final balance, based on the mercaptan introduced, is:

| | Mols |
|---|---|
| CH₃SH introduced, 1780 g., i.e. | 37.1 |
| CH₃SH recovered | |
| At the outlet of the apparatus, (5.2 g.) | 0.108 |
| In the organic phase (228 g.) | 4.75 |
| In the aqueous phase (55 g.) | 1.145 |
| CH₃SH transformed | |
| Into dimethyldisulphide | 30.4 |
| Into dimethyltrisulphide | 0.206 |
| | 36.609 |

Losses of $CH_3SH$: 37.1−36.6=0.5 mol., that is to say, 1.3% of the quantity used.

These figures lead to a transformation rate of

| | Percent |
|---|---|
| CH₃SH into DMDS | 82.5 |
| Yield, allowing for the recovery of CH₃SH | 99.4 |

*Example 4*

In a 50% aqueous solution of monoethanolamine (MEA), 1 atom of sulphur is suspended for 2 mols of MEA. To the suspension which is obtained, 2.1 mols of n-butyl mercaptan are added slowly in 20 minutes, while continuously stirring. The mixture is still stirred for 1 hour at ambient temperature. After decanting off the two phases formed, as in Example 1, there is found a transformation rate of 70% of n-butyl mercaptan into di-n-butyl disulphide.

*Example 5*

The operation of Example 4 is repeated, using n-hexyl mercaptan instead of n-butyl mercaptan. The transformation rate into dihexyl disulphide is 53%.

*Example 6*

Using the operational procedure of Example 2, the diethanolamine is replaced by triethanolamine, and the yield of dimethyl disulphide is then 76%.

*Example 7*

The operations of Example 4 are repeated with a solution of diethylene triamine at the rate of 0.75 mol (i.e. 2.25 amine equivalents) per atom of sulphur, instead of the monoethanolamine. The dibutyl disulphide is obtained under the same conditions as in Example 4.

*Example 8*

By replacing 37.1 mols of methyl mercaptan by the same number of mols of ethyl mercaptan, the operations of Example 2 are reproduced with a 40% aqueous suspension of hexylamine instead of monoethanolamine. The proportion of amine is 1.5 mols per mol of mercaptan, i.e. 55.6 mols in all (5650 g.).

The hexylamine used is a mixture of isomers boiling between 124° and 130° C.

The transformation rate of the ethyl mercaptan into diethyl disulphide $C_2H_5SSC_2H_5$ is 81% and the yield, allowing for the recovered mercaptan, is 98%.

*Example 9*

2.4 mols of thiophenol $C_6H_5SH$ are added in 15 minutes while stirring to a suspension of 1 atom of sulphur in a 50% aqueous solution of monoethanolamine containing 2 mols of this amine. The stirring is continued for another 15 minutes after completing the addition.

The diphenyl disulphide $C_6H_5SSC_6H_5$ which is obtained is extracted with the ether from the reaction medium. The yield of disulphide is 83% with respect to the sulphur employed, and this result is confirmed by the measurement of the $H_2S$ found in the aqueous phase. The transformation rate of the mercaptan is 69.5%.

We claim:

1. Process for the manufacture of hydrocarbon radical disulphide, which consists in: contacting sulphur with a mercaptan within an aqueous solution of an amine, the amine being at least in an amount stoichiometrically equal to the quantity of hydrogen sulphide which is sufficient to combine with the total hydrogen sulphide formed by the reaction between said sulphur and said mercaptan; and separating the disulphide containing liquid layer thus formed from the aqueous solution.

2. Process for the manufacture of hydrocarbon radical disulphide, which consists in: contacting sulphur with a mercaptan having 1 to 12 carbon atoms within a aqueous solution of an amine, the amount of amine being at least that which is sufficient to combine the totality of hydrogen sulphide formed by the reaction of said sulphur with said mercaptan, to form the hydrosulphide of the amine; and separating the disulphide containing liquid layer thus formed from the aqueous solution.

3. Process for the manufacture of hydrocarbon radical disulphide, which consists in: contacting sulphur powder with a mercaptan selected from the group consisting of alkyl mercaptans in which the alkyl radical has 1 to 12 carbon atoms, phenyl mercaptan, alkyl-phenyl mercaptans in which the total number of carbon atoms in their alkyl groups is 1 to 6, and naphthyl mercaptans, within an aqueous solution of an amine having its boiling point above 100° C., the amount of amine being of at least 1 equivalent for 2 moles of the mercaptan; and separating the disulphide containing liquid layer thus formed from the aqueous solution.

4. Process for the manufacture of hydrocarbon radical disulphide, which consists in: contacting at 0° to 50° C. sulphur powder with a mercaptan selected from the group consisting of alkyl mercaptans in which the alkyl radical has 1 to 12 carbon atoms, phenyl mercaptan, alkyl-phenyl mercaptans in which the total number of carbon atoms in their alkyl groups is 1 to 6, and naphthyl mercaptans, within an aqueous solution containing 10% to 80% of an amine having its boiling point above 100° C., the amount of amine being of at least 1 equivalent for 2 moles of the mercaptan; and separating the disulphide containing liquid layer thus formed from the aqueous solution.

5. Process for the manufacture of hydrocarbon radical disulphide, which consists in: contacting at 0° to 50° C. 0.5 to 3 atom-grams of sulphur powder with 2 mol-grams of a mercaptan selected from the group consisting of alkyl mercaptans in which the alkyl radical has 1 to 12 carbon atoms, phenyl mercaptan, alkyl-phenyl mercaptans in which the total number of carbon atoms in their alkyl groups is 1 to 6, and naphthyl mercaptans, within an aqueous solution containing 10% to 80% by weight of an amine having its boiling point above 100° C., the amount of amine being of 1 to 2 equivalents for 2 moles of the mercaptan; and separating the disulphide containing liquid layer thus formed from the aqueous solution.

6. Process for the manufacture of hydrocarbon radical disulphide, which consists in: contacting at 0° to 50° C. 0.5 to 3 atom-grams of sulphur powder with 2 mol-grams of a mercaptan selected from the group consisting of alkyl mercaptans in which the alkyl radical has 1 to 12 carbon atoms, phenyl mercaptan, alkyl-phenyl mercaptans in which the total number of carbon atoms in their alkyl groups is 1 to 6, and naphthyl mercaptans, within an aqueous solution containing 10% to 80% by weight of an ethanolamine, the amount of ethanolamine being of 1 to 2 equivalents for 2 moles of the mercaptan; and separating the disulphide containing liquid layer thus formed from the aqueous solution.

7. Process for the manufacture of hydrocarbon radical disulphides, which consists in: contacting a mercaptan selected from the group consisting of methylmercaptan, ethylmercaptan, propyl - n - mercaptan, isopropylmercaptan, butyl-n-mercaptan and phenylmercaptan, with an aqueous solution of 10% to 80% by weight of an ethanolamine having dispersed therein sulphur powder, during 10 to 120 minutes at 0° to 50° C., the proportion of sulphur being of 0.5 to 3 atom-grams and that of ethanolamine 1 to 2 equivalents for 2 mol-grams of mercaptan; and separating the disulphide containing liquid layer, thus obtained, from said aqueous solution.

8. Process for the manufacture of hydrocarbon radical disulphides, which consists in: contacting a mercaptan selected from the group consisting of methylmercaptan, ethylmercaptan, propyl-n-mercaptan, isopropylmercaptan, butyl-n-mercaptan and phenylmercaptan, with an aqueous solution of 10% to 80% by weight of an ethanolamine having dispersed therein sulphur powder, during 10 to 120 minutes at 0° to 50° C., the proportion of sulphur being of 0.5 to 3 atom-grams and that of ethanolamine 1 to 2 equivalents for 2 mol-grams of mercaptan; separating the disulphide containing liquid layer, thus obtained, from said aqueous solution; heating the solution to dissociate the ethanolamine hydrosulphide it contains to remove hydrogen sulphide from it; dispersing a new portion of sulphur powder in the ethanolamine solution thus recovered; and using the dispersion in a further contacting with mercaptan.

9. Process for the manufacture of dimethyl disulphide which consists in: bringing in thorough contact 0.75 to 1 atom-gram of sulphur powder with 2 mol-grams of methylmercaptan and 1 to 2 mol-grams of monoethanolamine in the form of an aqueous solution having about 50° monoethanolamine by weight; keeping these materials in contact during 10 to 45 minutes at temperature comprised between 0° and the ambient temperature; and separating the dimethyl-disulphide liquid layer, thus formed, from the aqueous solution.

10. Process for the manufacture of dimethyl disulphide which consists in: bringing in thorough contact 0.75 to 1 atom-gram of sulphur powder with 2 mol-grams of methylmercaptan and 1 to 2 mol-grams of monoethanolamine in the form of an aqueous solution having about 50% monoethanolamine by weight; keeping these materials in contact during 10 to 45 minutes at temperature comprised between 0° and the ambient temperature; separating the dimethyldisulphide liquid layer, thus formed, from the aqueous solution; heating the solution at about 75° C. and recovering the methylmercaptan which then escapes; heating the solution to distil the hydrogen sulphide contained therein; and recycling the monoethanolamine solution thus recovered to a further operation of bringing it in contact with sulphur and methylmercaptan.

11. Process for the manufacture of hydrocarbon radical disulphide, which consists in: contacting sulphur powder with a mercaptan selected from the group consisting of alkyl mercaptans in which the alkyl radical has 1 to 12 carbon atoms, phenylmercaptan, alkyl-phenyl mercaptans in which the total number of carbon atoms in their alkyl groups is 1 to 6, and naphthyl mercaptans, within an aqueous solution of an amine having its boiling point above 100° C., the amount of amine being of at least 1 equivalent for 2 moles of the mercaptan; separating the disulphide containing liquid layer, thus obtained, from said equous solution; heating the solution to distil the hydrogen sulphide it contains at a temperature below the boiling point of the amine; and recycling the amine solution, thus recovered, to a further operation of bringing it in contact with sulphur and mercaptan.

12. Process for the manufacture of hydrocarbon radical disulphide, which consists in: contacting at 0° to 50° C. 0.5 to 3 atom-grams of sulphur powder with 2 mol-grams of a mercaptan selected from the group consisting of alkyl mercaptans in which the alkyl radical has 1 to 12 carbon atoms, phenyl mercaptan, alkyl-phenyl mercaptans in which the total number of carbon atoms in their alkyl groups is 1 to 6, and naphthyl mercaptans, within an aqueous solution containing 10% to 80% by weight of an amine having its boiling point above 100° C., the amount of amine being of 1 to 2 equivalents for 2 moles of the mercaptan; separating the disulphide containing liquid layer, thus obtained, from said aqueous solution; heating the solution to distil the hydrogen sulphide it contains at a temperature below the boiling point of the amine; and recycling the amine solution, thus recovered, to a further operation of bringing it in contact with sulphur and mercaptan.

No references cited.

CHARLES B. PARKER, *Primary Examiner.*

DELBERT R. PHILLIPS, *Assistant Examiner.*